United States Patent
Hashimoto et al.

(10) Patent No.: US 11,208,252 B2
(45) Date of Patent: Dec. 28, 2021

(54) PACKAGING MATERIAL

(71) Applicant: KONICA MINOLTA, INC., Tokyo (JP)

(72) Inventors: Takeshi Hashimoto, Okazaki (JP); Hiromi Mizuguchi, Toyokawa (JP); Narutaka Yoshida, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 303 days.

(21) Appl. No.: 16/282,484

(22) Filed: Feb. 22, 2019

(65) Prior Publication Data

US 2019/0300260 A1   Oct. 3, 2019

(30) Foreign Application Priority Data

Mar. 29, 2018  (JP) .............................. JP2018-063805

(51) Int. Cl.
   *B65D 81/05*   (2006.01)
   *F16F 9/04*    (2006.01)

(52) U.S. Cl.
   CPC ......... *B65D 81/052* (2013.01); *B65D 81/054* (2013.01); *B65D 81/055* (2013.01); *F16F 9/0409* (2013.01); *F16F 9/0418* (2013.01)

(58) Field of Classification Search
   CPC .. B65D 81/052; B65D 81/054; B65D 81/055; B65D 81/05; B65D 81/053; B65D 81/056
   USPC ........................................ 206/522, 521, 586
   See application file for complete search history.

(56) References Cited

U.S. PATENT DOCUMENTS

| | | | | |
|---|---|---|---|---|
| 5,454,642 A * | 10/1995 | De Luca | ............... | B65D 81/052 206/522 |
| 5,826,723 A * | 10/1998 | Jaszai | ................... | B65D 81/03 206/522 |
| 7,482,051 B2 * | 1/2009 | Tanaka | ..................... | B32B 3/12 206/522 |
| 2004/0211697 A1 * | 10/2004 | Nakano | ................ | B65D 81/052 206/522 |
| 2005/0263425 A1 * | 12/2005 | Tanaka | ................. | B65D 81/052 206/522 |
| 2008/0060718 A1 * | 3/2008 | Liao | ..................... | B31D 5/0078 141/114 |
| 2008/0095474 A1 * | 4/2008 | Liao | ..................... | B65D 81/052 383/3 |
| 2008/0159659 A1 * | 7/2008 | Liao | ..................... | B65D 81/052 383/3 |

FOREIGN PATENT DOCUMENTS

| | | |
|---|---|---|
| JP | H07285581 A | 10/1995 |
| JP | H07291358 A | 11/1995 |
| JP | 2003341739 A | 12/2003 |
| JP | 2004323048 A | 11/2004 |
| JP | 2013180812 A | 9/2013 |

* cited by examiner

*Primary Examiner* — Robert Poon
(74) *Attorney, Agent, or Firm* — Buchanan Ingersoll & Rooney PC

(57) ABSTRACT

A packaging material includes: an outer box that accommodates an article to be packaged; and a cushioning material including: a sealed bag body with gas confined inside; a partition that divides an inside of the bag body into a first chamber and a second chamber each in an equal volume; and a ventilation passage communicating the first and second chambers, the cushioning material being disposed in a gap between an outer surface of the article and an inner wall of the outer box.

6 Claims, 7 Drawing Sheets

FIG. 1A
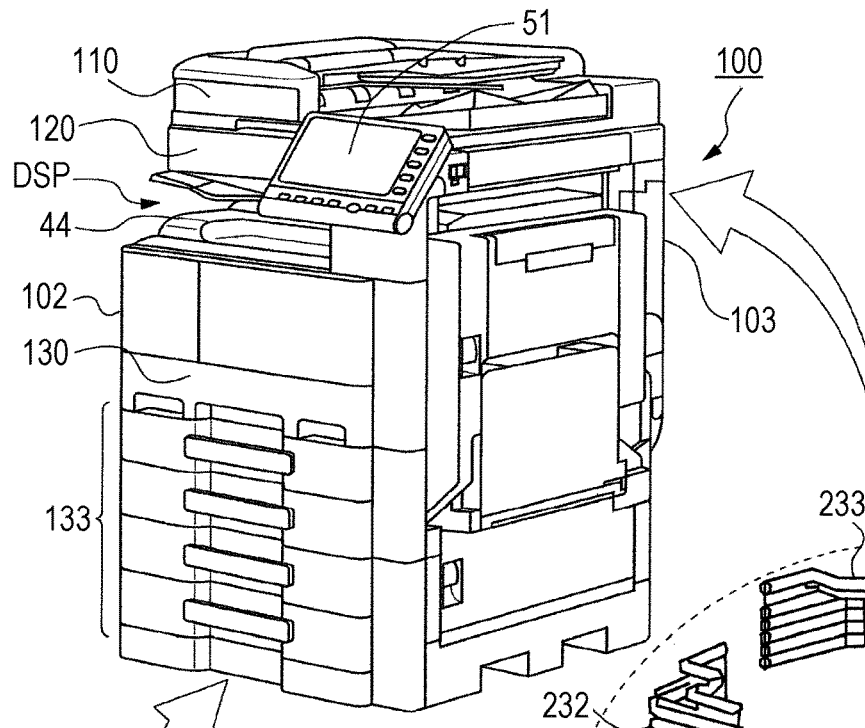
FIG. 1B
FIG. 1C
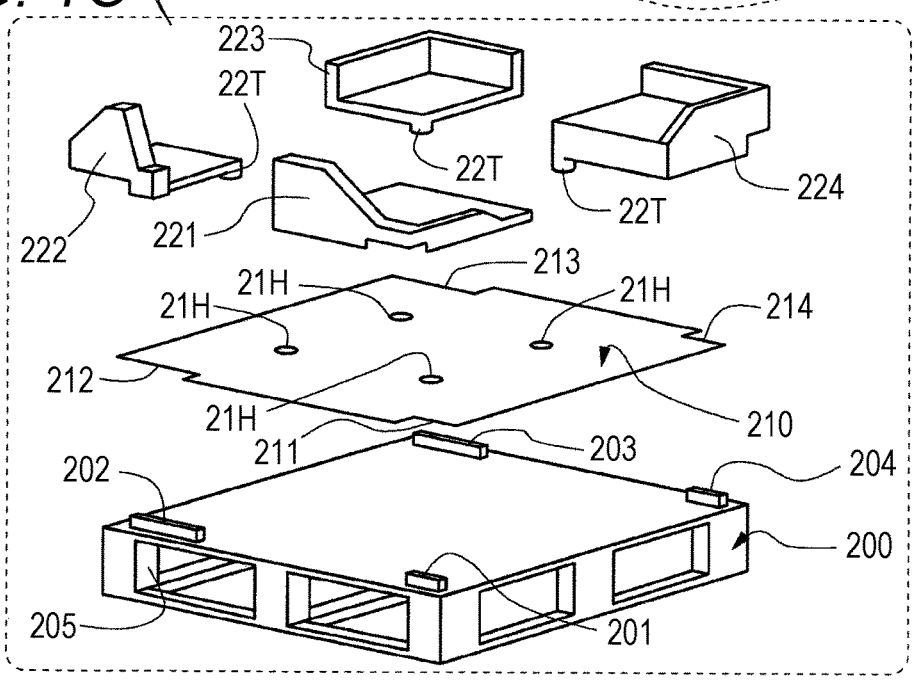

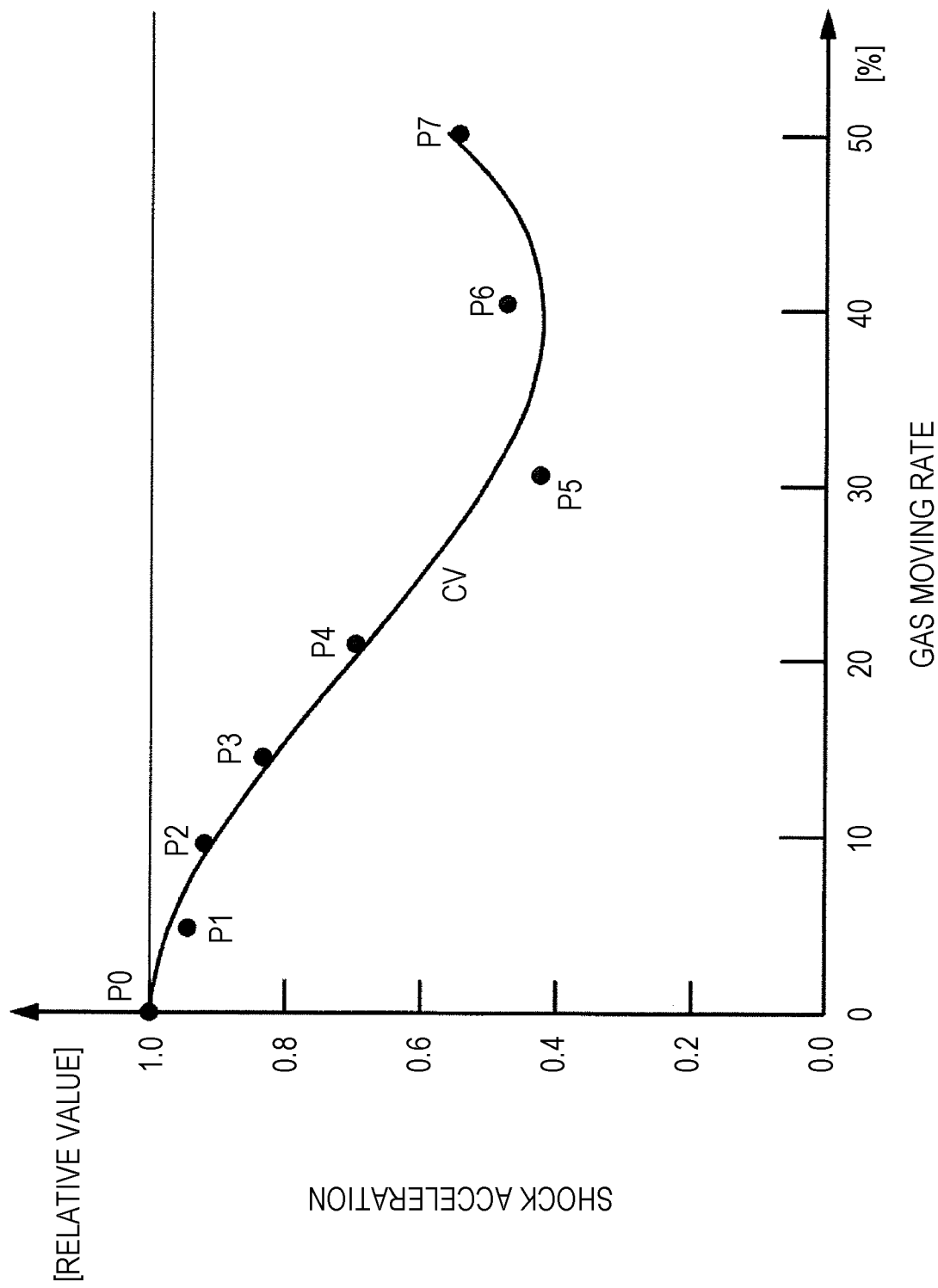

FIG. 6A
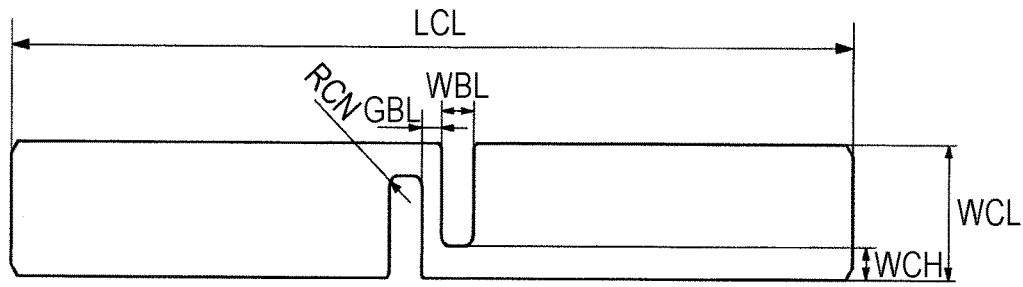
FIG. 6B
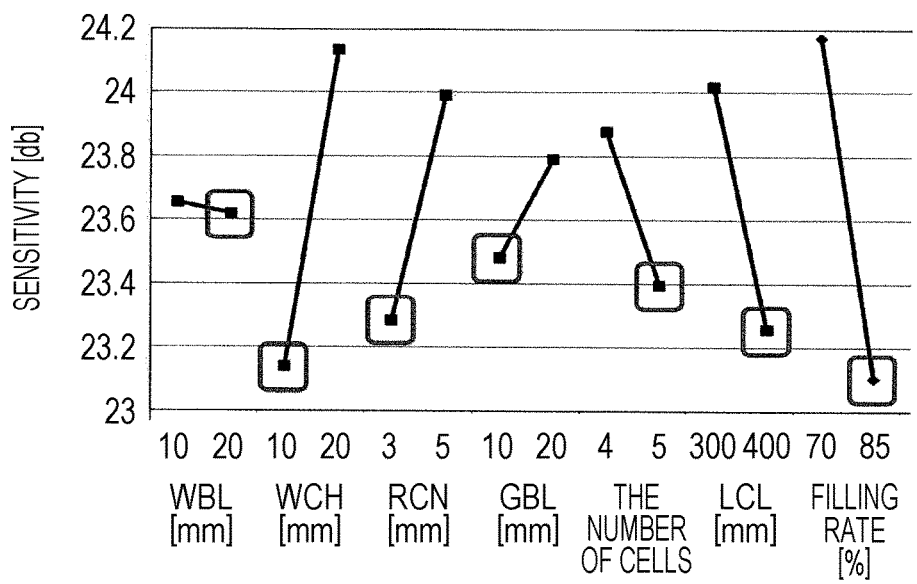
FIG. 6C
| WCL [mm] | WBL [mm] | WCH [mm] | RCN [mm] | GBL [mm] | THE NUMBER OF CELLS | LCL [mm] | FILLING RATE [%] | ACCELERATION [G] |
|---|---|---|---|---|---|---|---|---|
| 40 | 10 | 10 | 3 | 10 | 4 | 400 | 72 | 14.5 |
| 40 | 10 | 20 | 5 | 20 | 4 | 400 | 72 | 22.0 |
FIG. 6D
| GBL [mm] | THE NUMBER OF VERIFICATION | | |
|---|---|---|---|
| | 1 | 2 | 3 |
| 4 | × | × | × |
| 6 | ○ | ○ | × |
| 8 | ○ | ○ | ○ |
| 10 | ○ | ○ | ○ |
| 12 | ○ | ○ | ○ |

PACKAGING MATERIAL

The entire disclosure of Japanese patent Application No. 2018-063805, filed on Mar. 29, 2018, is incorporated herein by reference in its entirety.

BACKGROUND

Technological Field

The present invention relates to a packaging technique, and particularly to a cushioning material.

Description of the Related Art

When parts or products vulnerable to vibration shock from the outside, such as high-precision molded parts, precision machines, and electronic appliances, are transported, cushioning materials are essential for packaging these parts or products. The cushioning material is a highly elastic member or a plastic member, and is disposed around an object to be transported, that is, a package together with other packaging materials. Specifically, for example, when a package is accommodated in an outer box made of, for example, cardboard or wood, the cushioning material supports the package in the outer box, covers the package, or fills a gap between the package and the outer box. When the outer box receives vibration shock from the outside during transportation of the package, the cushioning material is accordingly deformed to absorb the vibration shock. This mitigates the vibration shock to be actually transmitted to the package, thereby preventing damage of the package due to the vibration shock.

Although various types of cushioning materials for packaging are used, cushioning materials relatively often used are roughly divided into a block type and a loose type. A cushioning material of the block type is preliminarily shaped in a brick (block) shape in accordance with the shape of the package, and often supports and fixes the package in the outer box. The block type cushioning material includes, for example, foamed plastic such as sponge and foam, paper, and wood. A cushioning material of the loose type is sheet- or chip-shaped. The cushioning material of this type is wrapped around the package upon packaging, packed in a gap between the outer box and the package while being rolled, or filled into the entire gap. The loose type cushioning material includes, for example, paper, cloth, foamed plastic, and bubble film (a composite film, which is also referred to as bubble cushioning material, having many small bags (cells) confining air sandwiched therebetween).

With growing interest in environmental issues such as global warming, increase in the disposal amount of packaging materials is considered as a problem. A significant amount of packaging materials that are disposed of is subject to incineration. Reduction in both generation of harmful gas along with the incineration and emission of carbon dioxide is strongly required. Reduction of foamed plastic used in packaging materials is considered as one means for meeting the need. The foamed plastic, in particular when used in the block type cushioning materials, has disadvantages of, for example, difficulty in size reduction (bulkiness), difficulty in recycling, a large amount of heat emitted during combustion, and existence of many types that generate harmful gas by combustion. Therefore, reduction of foamed plastic is effective for addressing the environmental issues.

In order to reduce the foamed plastic, an alternative cushioning material is required. One of possible alternatives is an air cushioning material (air cushion). The air cushioning material is obtained by connecting usually a plurality of bags including a sheet made of, for example, soft resin (see, e.g., JP H 07-285581 A, JP H 07-291358 A, and JP 2013-180812 A). Each bag is filled with gas such as air. When the bag receives external force, the gas in the bag is compressed to absorb and mitigate the external force.

Unfortunately, the air cushioning material has disadvantage in that the bag is easily ruptured by shock from the outside. A way of further enhancing cushioning effects is needed. A structure disclosed in, for example, JP 2003-341739 A and JP 2004-323048 A is known as the way. The structure communicates two or more bags to allow gas to bi-directionally move between these bags. In the case, when one bag is crushed by receiving external force, the gas moves from the bag to another bag. This configuration reduces the risk of the bag rupturing due to the external force, and causes resistance such as friction that the gas has during movement to change energy of the external force to, for example, heat and dissipate the heat, thereby enhancing the cushioning effect.

In an air cushioning material of a type in which air is moved between bags in response to external force, in order to achieve a sufficiently high cushioning effect, the structure is devised to have enhanced resistance received by the gas when the gas passes through a communication passage between the bags. For example, a destination-side bag is smaller in volume than an original-side bag in the structure disclosed in JP 2003-341739 A. In the structure disclosed in JP 2004-323048 A, two communication passages are provided between bags, and opposite unidirectional properties are imparted to the two communication passages with, for example, check valves. Unfortunately, these pieces of devisal increase the number of parts, and complicate the structure. These pieces of devisal thus disadvantageous for reducing manufacturing cost. In addition, the gas that has moved to another bag in response to external force returns to the original bag owing to the difference in atmospheric pressure between the bags along with removal of the external force. Unfortunately, the difference in atmospheric pressure tends to be insufficient for reliably returning all of the gas having moved to the other bag to the original bag. The bag having received the external force thus has difficulty in reliably restoring cushioning ability after released from the external force. When the bag receives next external force in a state where a gas amount in the bag is insufficient owing to insufficient restoration, there may occur troubles caused by deterioration of the cushioning effect, such as damages of a package due to so-called bottoming (phenomenon of a film of the bag on the side recessed by the external force colliding against an opposite film resulting from atmospheric pressure being unable to withstand the external force).

SUMMARY

An object of the invention is to solve the above-described problems, and particularly to provide a packaging material that can sufficiently increase resistance to be received by gas moving between bags in response to external force, and reliably restore the cushioning ability along with release from the external force, without increasing the number of parts of the cushioning material and complicating the structure.

To achieve the abovementioned object, according to an aspect of the present invention, a packaging material reflecting one aspect of the present invention comprises: an outer box that accommodates an article to be packaged; and a cushioning material including: a sealed bag body with gas confined inside; a partition that divides an inside of the bag body into a first chamber and a second chamber each in an equal volume, and a ventilation passage communicating the first and second chambers, the cushioning material being disposed in a gap between an outer surface of the article and an inner wall of the outer box, wherein the cushioning material is bent at the partition placed along one side of the article, one of two outer surfaces of the article sharing the one side is brought into contact with an outer surface of the first chamber of the bag body, and another is brought into contact with an outer surface of the second chamber of the bag body, the outer box applies pressure on outer surfaces of the first and second chambers of the bag body in a state where the article and the cushioning material are accommodated, and pushes the first and second chambers to each of the two outer surfaces of the article, when the first chamber of the bag body receives external force through the outer box, gas is moved from the first chamber to the second chamber through the ventilation passage against pressure applied to the second chamber by the outer box, and when the external force is removed, the gas is returned from the second chamber to the first chamber through the ventilation passage owing to the pressure applied to the second chamber by the outer box, and the ventilation passage includes a bending section whose ventilation direction crosses a straight line connecting centers of the first and second chambers when the bag body is flat, and a position, a shape, or a width of the bending section is designed such that a straight line parallel to the straight line connecting the centers cannot be drawn from the first clamber to the second chamber in the ventilation passage without traversing the partition, and a flow rate of gas to be returned from the second chamber to the first chamber upon removal of the external force is secured at a predetermined value or more.

BRIEF DESCRIPTION OF THE DRAWINGS

The advantages and features provided by one or more embodiments of the invention will become more fully understood from the detailed description given hereinbelow and the appended drawings which are given by way of illustration only and thus are not intended as a definition of the limits of the present invention:

FIG. 1A is a perspective view illustrating an appearance of an image forming apparatus to be packaged;

FIG. 1B is a perspective view illustrating appearances of elements of packaging materials used for the apparatus illustrated in FIG. 1A, the elements being disposed in an upper portion of the apparatus;

FIG. 1C is a perspective view illustrating appearances of the other elements of the packaging materials, the other elements disposed in a lower portion of the apparatus;

FIG. 5 is a graph illustrating cushioning ability of the fourth air cushioning material in the state illustrated in FIG. 4A;

FIG. 6A is a schematic diagram illustrating design parameters of a bag body;

FIG. 6B is a factor effect diagram illustrating the sensitivity of the bag body to shock acceleration in relation to these parameters;

FIG. 6C is a table illustrating one example of the relation between design conditions of the air cushioning material and the shock acceleration;

FIG. 6D is a table illustrating the relation between values of a width of a ventilation passage and a width of a bending section, and success or failure of restoration of the cushioning ability, in the case where these widths are equal.

DETAILED DESCRIPTION OF EMBODIMENTS

Figure 2C:
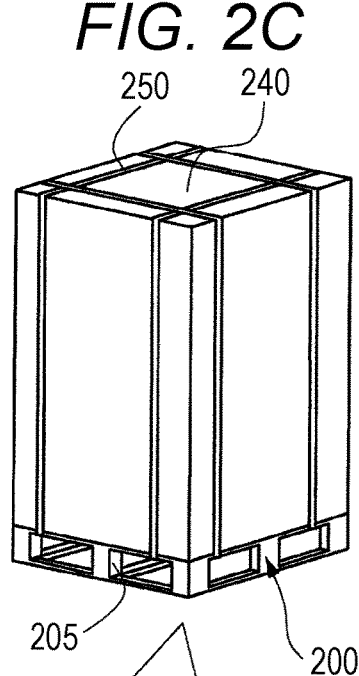
FIG. 2C is a perspective view illustrating an appearance in the state where the outer box illustrated in FIG. 2B covers the packaging materials and the apparatus illustrated in FIG. 2A.

Hereinafter, one or more embodiments of the present invention will be described with reference to the drawings. However, the scope of the invention is not limited to the disclosed embodiments.

[Appearance of Image Forming Apparatus]

FIG. 1A is a perspective view illustrating an appearance of an image forming apparatus 100 to be packaged. The image forming apparatus 100 is a multi-function peripheral (MFP) of in-body paper ejection type, and has combined functions of a scanner, a color copier, and a color printer. An auto document feeder (ADF) 110 is mounted so as to be opened and closed on the upper surface of a housing of the MFP 100. The housing has a built-in scanner 120 in an upper portion positioned immediately below the ADF 110, and a built-in printer 130 in a lower portion. The housing also has a plurality of stages of paper feeding cassettes 133 attached so as to be drawn out in a bottom portion. A gap DSP is provided between the scanner 120 and the printer 130, and a paper ejecting tray 44 is disposed in the gap DSP. A paper ejecting port (not illustrated) is provided in the back of the gap DSP, and a sheet of paper is ejected from the paper ejecting port to the paper ejecting tray 44. An operation panel 51 is attached to a front portion of the housing. The front portion is positioned beside the gap DSP. A touch panel is embedded on the front surface of the operation panel 51, and various mechanical push-buttons are arranged around the touch panel. The touch panel displays a graphics user interface (GUI) screen such as an operation screen and an input screen for various pieces of information. The operation panel 51 receives an input operation of user through gadgets, such as an icon, a virtual button, a menu, and a toolbar, displayed on the touch panel, and push-buttons around the touch panel.

[Packaging of Image Forming Apparatus]

FIG. 1B is a perspective view illustrating appearances of elements of packaging materials used for the MFP 100 illustrated in FIG. 1A, the elements being disposed in an upper portion of the MFP 100, and FIG. 1C is a perspective view illustrating appearances of the other elements of the packaging materials, the other elements disposed in a lower portion of the MFP 100. FIG. 2A is a perspective view illustrating an appearance in the state where these elements are disposed around the MFP 100. The packaging material includes a pallet 200, a pad 210, block type cushioning materials 221 to 224, and air cushioning materials 231 to 235 in order from the bottom side of the MFP 100. The pallet 200 is a member commonly used as a platform on which a package is placed during loading/unloading, transportation, and storage of the package in the logistics industry. The pallet is a rectangular plate made of wood, hard resin, or metal, and the size is unified to 1100 mm×1100 mm×144 mm by Japanese Industrial Standards (JIS). The bottom surface of the MFP 100 is smaller than the plate surface of the pallet 200, and thus the MFP 100 can be stacked on one pallet 200. The pad 210 is a thin plate shaped cushioning material having a plate surface of almost the same size as the plate surface of the pallet 200, and includes highly elastic or plastic material, such as cardboard, woody plywood, hard resin, and foamed plastic. The pad 210 has cuts 211 to 214 in the four corners. The pad 210 is fitted on the upper surface of the pallet 200 such that these cuts 211 to 214 abut on lateral surfaces of positioning blocks 201 to 204 projecting upward from the four corners on the upper surface of the pallet 200. The block type cushioning materials 221 to 224 include foamed plastic such as styrofoam, and are preliminarily shaped in accordance with the surface shape of the MFP 100 so as to be in close contact with the surface of the MFP 100. Specifically, as illustrated in FIG. 2A, the first to fourth cushioning materials 221 to 224 cover the entire corners of the bottom surface of the MFP 100 one by one. In addition, the first to fourth cushioning materials 221 to 224 include protrusions 22T projecting downward from the bottom surface, and are fixed to the pad 210 by inserting each of the protrusions 22T into each hole 21H in the plate surface of the pad 210. A first air cushioning material 231 covers an outer end corner of the paper ejecting tray 44 of the MFP 100, a vertical side 102 of the MFP 100, and edges of front and lateral surfaces of the MFP 100. The vertical side 102 extends immediately downward from the outer end corner. The front and lateral surfaces share the vertical side 102. A second air cushioning material 232 covers one corner of the ADF 110 and the scanner 120 positioned above the vertical side 102. Third and fourth air cushioning materials 233 and 234 are disposed one by one at two corners of the ADF 110 positioned on the back-surface side of the MFP 100. Since the operation panel 51 is positioned at the remaining corner of the ADF 110, a fifth air cushioning material 235 covers an edge of the upper surface of the ADF 110 instead of the corner. The edge is positioned beside the operation panel 51.

Figure 2B:
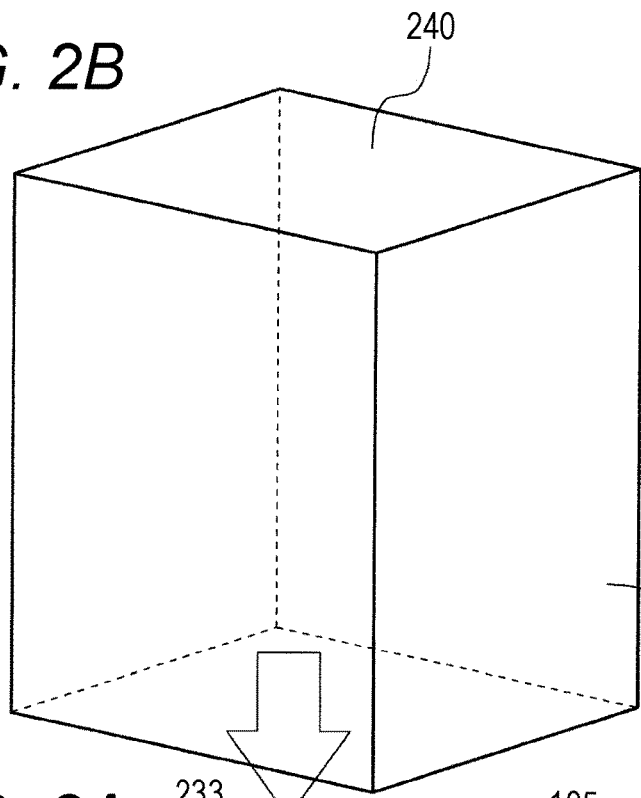
FIG. 2B is a perspective view illustrating an appearance of an outer box of the packaging materials used for the apparatus.
Figure 2A:
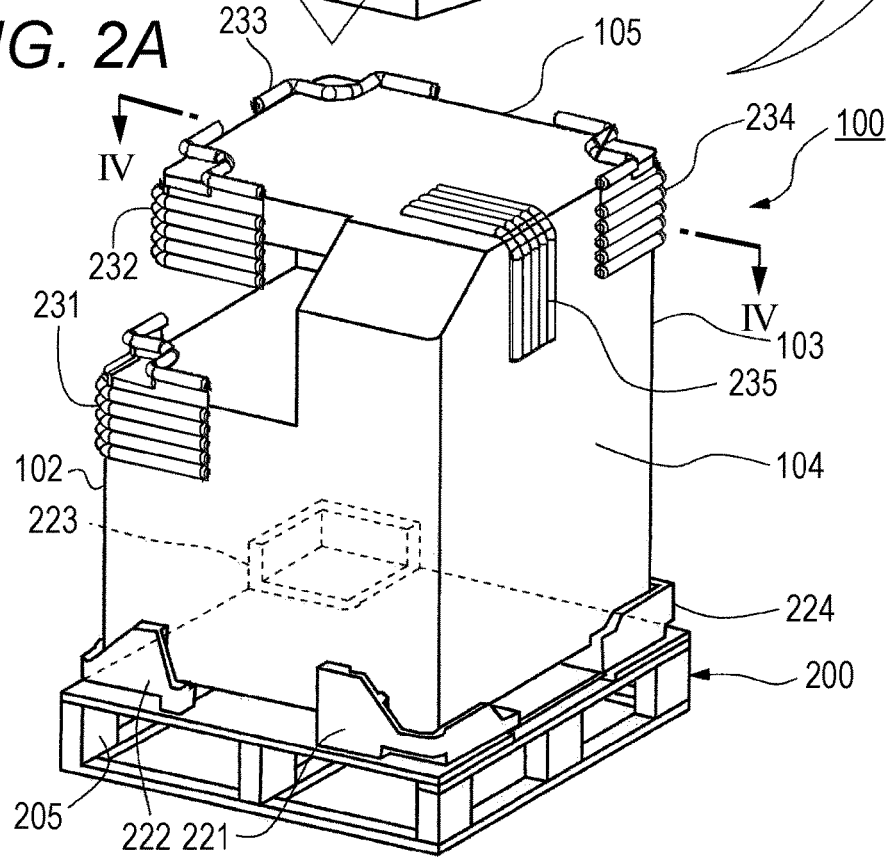
FIG. 2A is a perspective view illustrating an appearance in the state where the elements of the packaging materials illustrated in FIGS. 1B and 1C are disposed around the apparatus to be packaged.

FIG. 2B is a perspective view illustrating an appearance of an outer box 240 of the packaging materials used for the MFP 100. FIG. 2C is a perspective view illustrating an appearance in the state where the outer box 240 illustrated in FIG. 2B covers the MFP 100 around which the other elements of the packaging material illustrated in FIG. 2A, that is, the pallet 200, the pad 210, the cushioning materials 221 to 224, and the air cushioning materials 231 to 235 are disposed. The outer box 240 is obtained by combining or folding wall materials including a lightweight material with high strength, such as hard cardboard, wood, and hard resin, in a cuboid shape. The outer box 240 has an open bottom and an internal space size: length×width×height, one size larger than the size of the MFP 100. When the outer box 240 covers the MFP 100 illustrated in FIG. 2A from above, and the pallet 200 blocks the opening of the outer box 240, as illustrated in FIG. 2C, the entire MFP 100 is hidden inside the outer box 240, and cannot be seen from the outside. In this state, the outer box 240 is tied to the pallet 200 with a fixing band 250. The fixing band 250 is a band or a string made of metal or soft resin, such as a band iron and a wire. In this way, the packaging of the MFP 100 is completed. The MFP 100 is then transported by applying force to the pallet 200, for example, hooking the pallet 200 by engaging a fork of a forklift or a carriage into a hole 205 on a lateral surface of the pallet 200. In the case, an outer box (without a pallet) accommodating another MFP may be stacked on the upper surface of the outer box 240. The weight of the stacked MFP is added to the pallet 200 through the outer box 240. The outer box 240 has such high rigidity to an extent that two MFPs can be transported without deformation of the outer box 240, that is, the outer box 240 can sufficiently endure the weight of several MFPs in this state.

The first to fourth cushioning materials 221 to 224 are designed to have a size with which an inner wall of the outer box 240 and outer surfaces of the first to fourth cushioning materials 221 to 224 are in contact with each other in the state where the first to fourth cushioning materials 221 to 224 are accommodated in the outer box 240 together with the MFP 100 as illustrated in FIG. 2C. In this state, each cushioning material receives pressure toward an outer surface of the MFP 100 from an inner wall portion of the outer box 240. The outer surface of each cushioning material is in contact with the inner wall portion. The pressure is based on stress of the outer box 240 caused by the high rigidity of the outer box 240. The stress prevents deformation of the outer box 240 caused by contact with the outer surface of each cushioning material. The first to fourth cushioning materials 221 to 224 endure the weight of the MFP 100, and support the bottom surface of the MFP 100 at the four corners. The pressure from the inner wall of the outer box 240 fixes horizontal positions of the cushioning materials 221 to 224. The cushioning materials 221 to 224 thus stabilize the MFP 100 in the outer box 240 particularly in the horizontal direction. The first to fourth cushioning materials 221 to 224 together with the pad 210 also absorb vibration shock that the pallet 200 receives from the outside particularly in the vertical direction to partially mitigate the shock to be transmitted to the MFP 100. In this way, the first to fourth cushioning materials 221 to 224 endure the weight of the MFP 100 in the outer box 240 to stabilize the MFP 100. These cushioning materials 221 to 224 are required to have high strength in addition to cushioning ability, and thus formed of foamed plastic as before.

Gas such as air is enclosed in the air cushioning materials 231 to 235 such that the air cushioning materials 231 to 235 are in contact with both of the surface of the MFP 100 and the inner wall of the outer box 240 in the state where the air cushioning materials 231 to 235 are accommodated in the outer box 240 together with the MFP 100 as illustrated in FIG. 2C. In this state, each of the cushioning materials 231 to 235 receives pressure toward the outer surface of the MFP 100 from the inner wall portion of the outer box 240. The outer surface of each cushioning material is in contact with the inner wall portion. The pressure is based on stress of the outer box 240 caused by the high rigidity of the outer box 240. The stress prevents deformation of the outer box 240 caused by atmospheric pressure in each chamber. Each of the cushioning materials 231 to 235 is kept at the position while being sandwiched between the MFP 100 and the outer box 240. When a lateral surface of the outer box 240 receives the vibration shock from the outside, gas inside the air cushioning materials 231 to 235 is not only decreased in volume but flows inside the cushioning materials in accordance with pressure, which is increased along with the vibration shock, from the inner wall of the outer box 240. The contraction and flow convert a part of energy of the vibration shock into heat to dissipate the heat around. This configuration mitigates the vibration shock to be transmitted to the MFP 100.

[Structure of Air Cushioning Material]

Figure 3A:
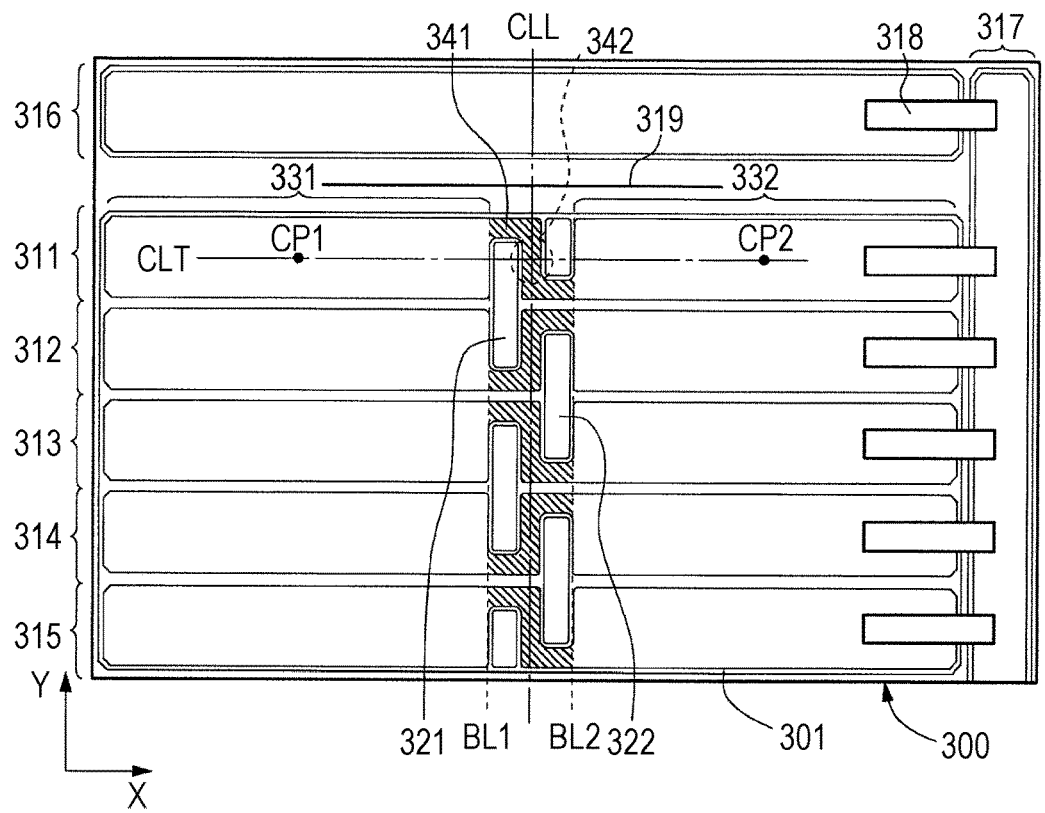
FIG. 3A is a plan view of an air cushioning material illustrated in FIG. 1B.
Figure 3B:
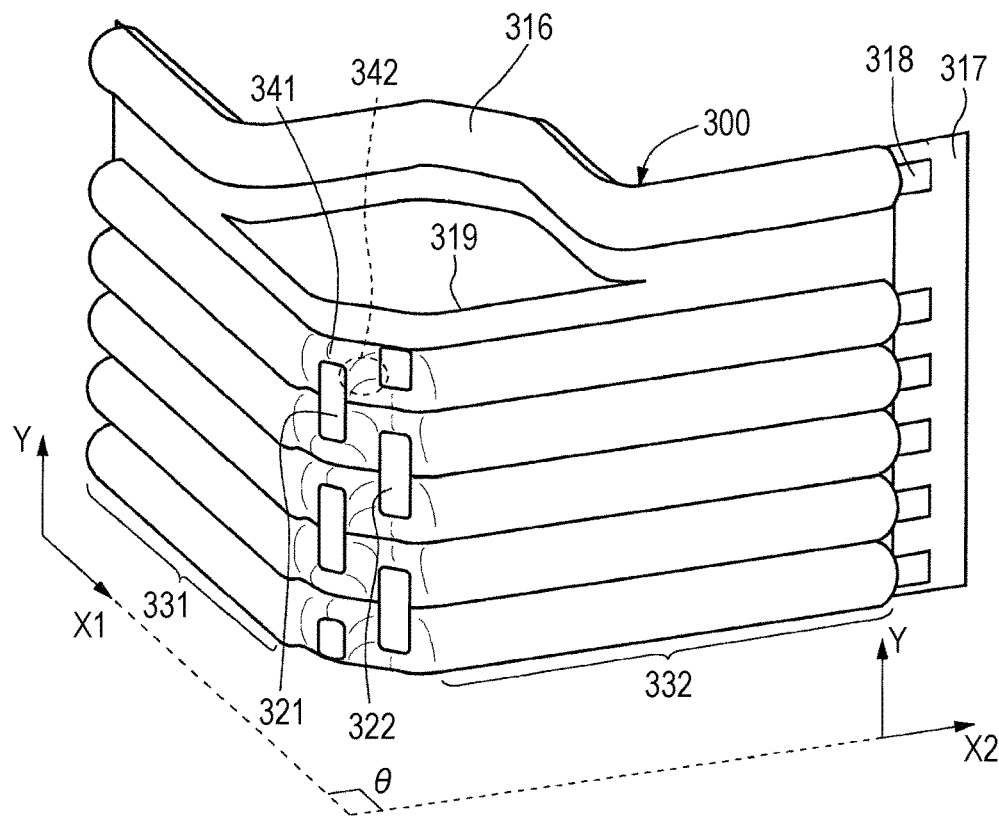
FIG. 3B is a perspective view thereof.

FIG. 3A is a plan view of the first air cushioning material 231, and FIG. 3B is a perspective view of the first air cushioning material 231. The other air cushioning materials 232 to 235 have the same structure except the later-described beam. The first air cushioning material 231 includes two sheets made of soft resin, for example, composite (laminated) sheets 300 of nylon and polyethylene. These sheets 300 have the same rectangular shape and the same size, and the entire sheets are deposited on each other. Each sheet 300 has a double structure of, for example, an inside nylon layer and an outside polyethylene layer. The nylon layer has high gas barrier properties and strength. The polyethylene layer thus has excellent thermal processability. The sheet 300 can be easily processed by thermal welding (heat sealing), and has both of high strength and airtightness.

The sheet 300 is divided into, for example, six bag bodies (also referred to as "cells") 311 to 316 by a thermal welding portion 301. Each of the bag bodies 311 to 316 is a region having the entire circumference sealed with the thermal welding portion 301. All of the bag bodies 311 to 316 have the same strip shape in a planar shape (shape in the state where the entire sheet 300 is flat) and an equal size. The bag bodies 311 to 316 are arranged in parallel to a short side (Y-axis direction in the figure) of the sheet 300 (hereinafter, the arrangement direction (Y-axis direction) of the bag bodies 311 to 316 is referred to as a "width direction") with the longitudinal direction being parallel to a long side (X-axis direction in the figure) of the sheet 300. The sixth bag body 316 is closest to one side (upper side in the figure) of the long sides of the sheet 300. The next first bag body 311 is arranged at a distance from the sixth bag body 316. The first to fifth bag bodies 311 to 315 are arranged at distances narrower than that between the sixth bag body 316 and the first bag body 311. A slit 319 is provided in a gap between the sixth bag body 316 and the first bag body 311, and extends at the position equidistant from both of the bag bodies 316 and 311 in parallel to the longitudinal direction (X-axis direction) of both of the bag bodies 316 and 311.

All of the bag bodies 311 to 316 confine gas, such as air, inside, and have the filling rate of more than 50%, preferably 55% or more. The "filling rate" is a rate of the cross-sectional area (including internal space) of a bag body in the state where gas is enclosed inside with respect to the area of a perfect circle having the circumferential length equal to that in cross-section of the bag body with no acting tension. Air is blown from the outside into the bag bodies 311 to 316 through an air guide tube 317 and check valves 318 when the first air cushioning material 231 is manufactured. The air guide tube 317 is a strip-shaped region extending from one of the long sides of the sheet 300 to the other along one of the short sides of the sheet 300. Three sides of the air guide tube 317 except one side positioned at the one of the long sides of the sheet 300 are sealed by the thermal welding portion 301. The air guide tube 317 is adjacent to each of ends of the first to sixth bag bodies 311 to 316 on the side opposite to the short side of the sheet 300. Time check valves 318 are installed one by one between the air guide tube 317 and each of the bag bodies 311 to 316 to pass air only in the direction from the air guide tube 317 to each of the bag bodies 311 to 316.

Each of the first to fifth bag bodies 311 to 315 except the sixth bag body 316 includes partitions 321 and 322 in the central portion in the longitudinal direction (X-axis direction). The partitions 321 and 322 are regions obtained by thermally welding inner surface portions of the sheet 300 to each other, the portions are opposed to each other across the pieces of internal space of the bag bodies 311 to 315. The partitions include, for example, two types of blocks 321 and 322. Both of the blocks 321 and 322 have rectangular a shape elongated in the width direction (Y-axis direction) of the bag body in the planar shape. The blocks 321 and 322 have an equal width in the longitudinal direction (X-axis direction) of the bag body, and have entire circumferences sealed by the thermal welding portion 301. The first type block 321 extends, along a first straight line BL1 parallel to the width direction (Y-axis direction) of the bag body, from the inside of the first bag body 311 to the inside of the second bag body 312, from the inside of the third bag body 313 to the inside of the fourth bag body 314, and from the inside of the fifth bag body 315 to the edge of the fifth bag body 315. The second type block 322 extends, along a second straight line BL2 parallel to the width direction (Y-axis direction) of the bag body, from the edge of the first bag body 311 to the inside of the first bag body 311, from the inside of second bag body 312 to the inside of the third bag body 313, and from the inside of the fourth bag body 314 to the inside of the fifth bag body 315. This configuration divides the internal space of each of the bag bodies 311 to 315 into a first chamber 331 and a second chamber 332. The first chamber 331 borders the first type block 321. The second chamber 332 borders the second type block 322. The first and second chambers 331 and 332 have equal volume and outer circumferences in the planar shape which are symmetric with respect to a center line CLL in the longitudinal direction (X-axis direction) of the bag body.

Ends of both of the blocks 321 and 322 in the width direction of the bag body is positioned inside each of the bag bodies 311 to 315. This configuration leads to a gap between each of the blocks 321 and 322 and a long side of each of the bag bodies 311 to 315. A gap is also provided between the first type block 321 and the second type block 322 in the longitudinal direction (X-axis direction) of the bag body. These gaps (hatched areas in FIG. 3A) 341 communicate the first chamber 331 and the second chamber 332, and function as a ventilation passage between both chambers. The ventilation direction of a section 342, which is formed of a gap between the first type block 321 and the second type block 322, of the ventilation passage 341 is orthogonal to a straight line CLT connecting a center point CP1 of the first chamber 331 and a center point CP2 of the second chamber 332 in the planar shape. The section 342 makes it impossible to draw a straight line parallel to the straight line CLT connecting the center points CP1 and CP2 of both of the chambers 331 and 332 in the ventilation passage 341 from the first chamber 331 to the second chamber 332 without traversing any of the blocks 321 and 322. In this sense, the section 342, which is formed of the gap between the first type block 321 and the second type block 322, of the ventilation passage 341 will hereinafter be referred to as a "bending section".

As illustrated in FIG. 3B, in the state where the bag bodies 311 to 315 are filled with air, the blocks 321 and 322 are thinner than any of the first and second chambers 331 and 332 (shorter in size in the normal direction of the paper, in FIG. 3A). This configuration facilitates the bag bodies 311 to 315 to be bent at the partitions 321 and 322, which serve as folds. Generally, an angle θ, which is formed by the longitudinal direction (X1-axis direction in FIG. 3B) of the first chamber 331 and the longitudinal direction (X2-axis direction in FIG. 3B) of the second chamber 332, is set to 90 degrees. This configuration enables each of the first to fifth air cushioning materials 231 to 235 to be in contact with both of two outer surfaces sharing one side of the housing of the MFP 100 as illustrated in FIG. 2A.

In the first to fourth air cushioning materials 231 to 234, the slit 319 is opened, and the sixth bag body 316 is bent in the direction opposite to the bending direction of the other bag bodies 311 to 315. The other bag bodies 311 to 315 have an L-shape, whereas the sixth bag body 316 has an M-shape. That is, the central portion in the longitudinal direction of the sixth bag body 316 fixes the bending angle θ between the first and second chambers 331 and 332 of the other bag bodies 311 to 315 as a so-called angle brace. In addition, when each of the first to fourth air cushioning materials 231 to 234 covers one corner of the housing of the MFP 100, the first and second chambers 331 and 332 are brought into contact with two lateral surfaces of three outer surfaces sharing the corner, whereas the central portion (beam) of the sixth bag body 316 is put over the remaining upper surface. The outer box 240 further presses the beam of each of the first to third air cushioning materials 231 to 233 on the upper surface of the ADF 110. In this nay, the beam stabilizes the first to fourth air cushioning materials 231 to 234 at the corners of the housing of the MFP 100.

[Function of Air Cushioning Material]

Figure 4A:
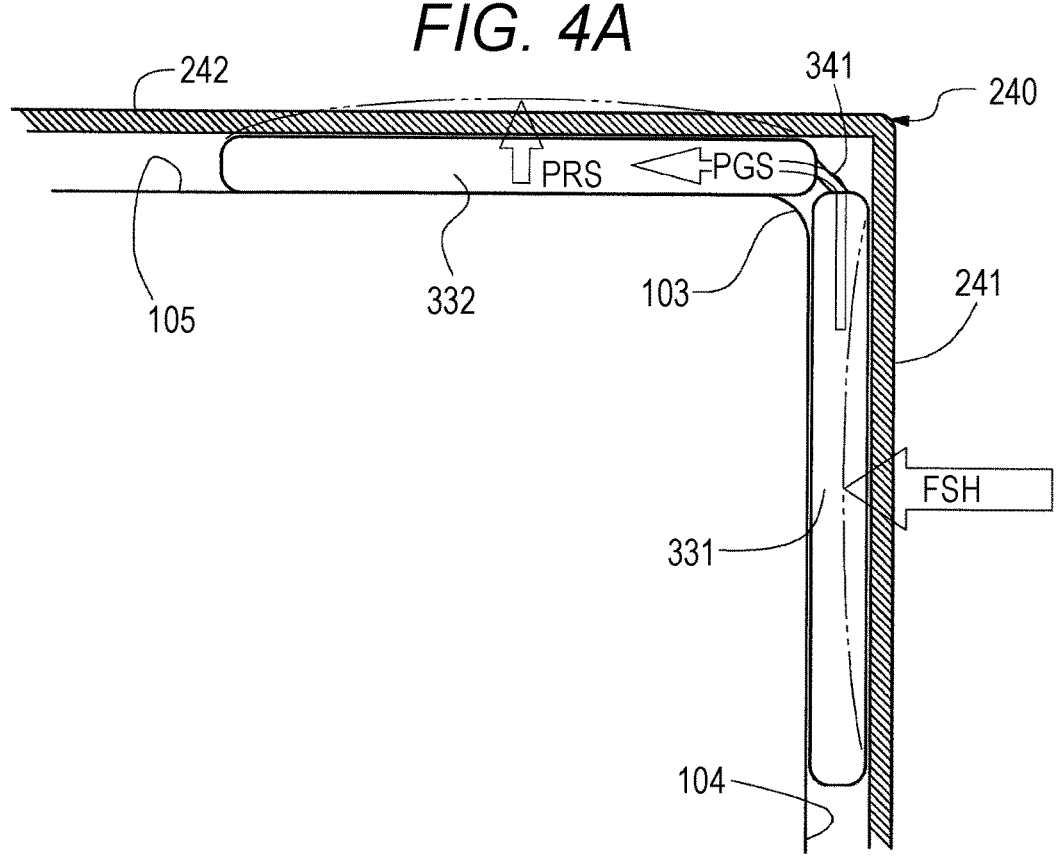
FIG. 4A is a cross-sectional view of the outer box and a fourth air cushioning material, taken along a straight line IV-IV illustrated in FIG. 2A.

FIG. 4A is a cross-sectional view of the outer box 240 and the fourth air cushioning material 234, taken along the straight line IV-IV illustrated in FIG. 2A. When the fourth air cushioning material 234 is used as a packaging material for the MFP 100, the partitions 321 and 322 are placed along a vertical side 103 of the MFP 100, the bag bodies 311 to 316 are bent at the partitions 321 and 322, and outer surfaces of the first and second chambers 331 and 332 are in contact with a lateral surface 104 and a back surface 105, which share the vertical side 103, of the MFP 100, respectively, as illustrated in FIG. 2A. Pressure from the inner wall of the outer box 240 further presses the outer surfaces against the lateral surface 104 and the back surface 105 of the MFP 100. Each of the chambers 331 and 332 is compressed until the internal atmospheric pressure comes into balance with the pressure from the inner wall of the outer box 240. When, for example, a lateral wall 241 of the outer box 240 receives shocking force FSH from the outside in the state, the lateral wall 241 gets dented accordingly. Increase in pressure from the inter surface of the lateral wall 241 crushes the first chamber 331, and the volume of the gas inside the first chamber 331 is reduced. Energy applied from the outside along with the shocking force FSH is thus absorbed by the lateral wall 241 of the outer box 240 as elastic energy, and dissipated as heat from the gas in the first chamber 331 along with the volume reduction.

Stronger shocking force FSH causes a part of gas PGS to flow from the first chamber 331 to the second chamber 332 through the ventilation passage 341. At the time, the moving gas PGS has high resistance in the ventilation passage 341. Actually, the ventilation passage 341 includes the bending section 342, and thus has a length considerably longer than that projected on a plane (X1-X2 plane illustrated in FIG. 3B) containing both of the longitudinal direction (X1-axis direction) of the first chamber 331 and the longitudinal direction of the second chamber 332 (X2-axis direction). This configuration deprives the gas PGS of much heat by friction against the inner surface of the ventilation passage 341. In addition, when the gas PGS passes through the bending section 342, the flowing direction of the gas PGS rotates not only in the plane (X1-X2 plane) containing the longitudinal directions of both of the chambers 331 and 332, but greatly changes also in the direction (Y-axis direction in FIG. 3B) vertical to the plane. This results from the feature of the bending section 342: "the section 342 makes it impossible to draw a straight line parallel to the straight line CLT connecting the center point CP1 of the first chamber 331 and the center point CP2 of the second chamber 332 in the ventilation passage 341 from the first chamber 331 to the second chamber 332 without traversing the partitions 321 and 322". Such larger three-dimensional change in the air flow direction in the bending section 342 deprives the gas PGS of large kinetic energy during passage. In addition, the gas PGS having finished passing through the ventilation passage 341 increases atmospheric pressure PRS in the second chamber 332. A back wall 242 of the outer box 240 is thus pushed back to be elastically deformed. In this way, the energy applied to the first chamber 331 from the outside along with the shocking force FSH is dissipated as heat while the gas PGS passes through the ventilation passage 341, and absorbed by the back wall 242 of the outer box 240 as elastic energy when the gas PGS flows into the second chamber 332. Such cushioning action resulted from cooperation of the fourth air cushioning material 234 and the outer box 240 cushions a part of energy applied to the first chamber 331 from the outside along with the shocking force FSH. The part of energy is to be transmitted to the lateral surface 104 of the MFP 100.

Figure 4B:
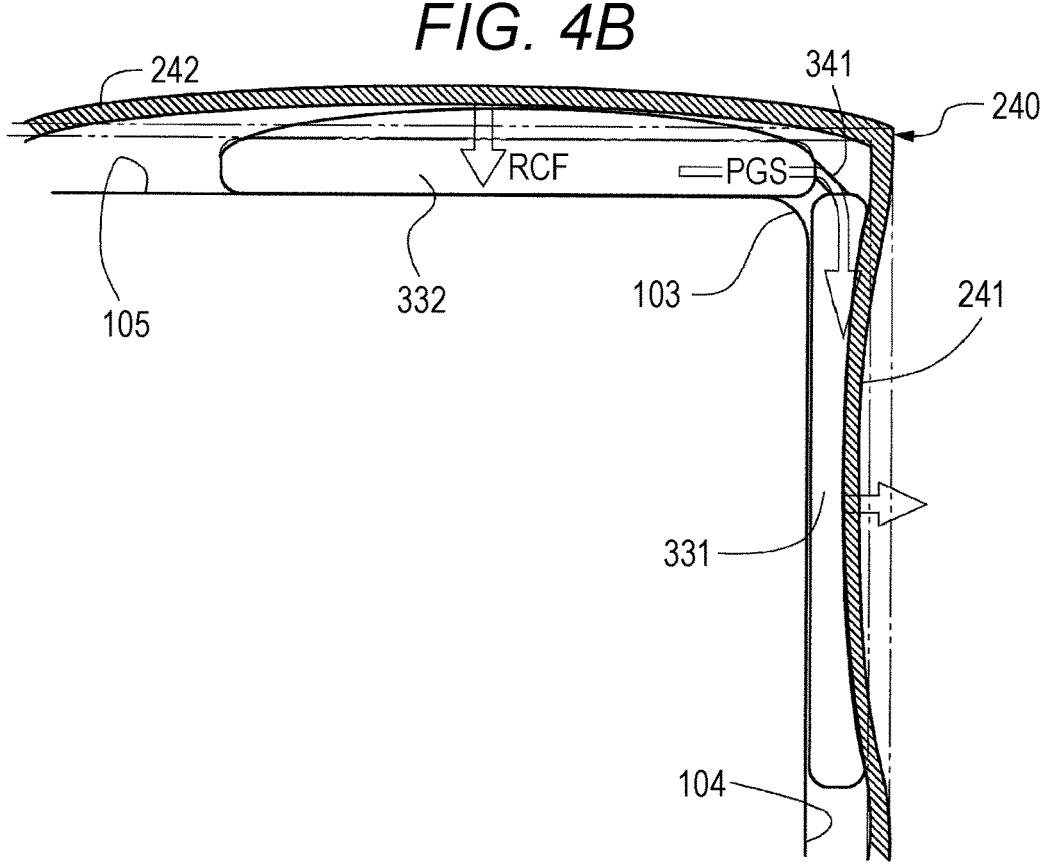
FIG. 4B is a cross-sectional view of the outer box and the fourth air cushioning material immediately after shocking force illustrated in FIG. 4A is removed.

FIG. 4B is a cross-sectional view of the outer box 240 and the fourth air cushioning material 234 immediately after the shocking force FSH illustrated in FIG. 4A is removed. When the shocking force FSH is removed, the lateral wall 241 and the back wall 242 of the outer box 240 release elastic energy, which is store in each of the lateral wall 241 and the back wall 242, to return from the deformed state to the original flat state. At the time, restoring force RCF of the back wall 242 crushes the second chamber 332 to return the part of gas PGS from the second chamber 332 to the first chamber 331 through the ventilation passage 341. The width of the ventilation passage 341 can be designed such that the amount of the gas PGS returning at the time is equal to the amount of the gas PGS moved from the first chamber 331 to the second chamber 332 along with the shocking force FSH. This results from the following reason.

Generally, since the restoring force RCF of the back wall 242 is weaker than the shocking force FSH, the air flow from the second chamber 332 to the first chamber 331 is slower than the air flow from the first chamber 331 to the second chamber 332 illustrated in FIG. 4A. Air flow having slower flow speed loses less kinetic energy along with change in the direction, and thus the flow of the gas PGS has lower resistance during passage through the bending section 342. In contrast, a larger cross-sectional area of a flow passage leads to a lower proportion of a part, which is lost by friction with the inner surface of the flow passage, of kinetic energy of the flow. Consequently, the width of the ventilation passage 341 designed to be sufficiently large can keep the proportion of the energy lost as frictional heat during passage of the flow of the gas PGS through the ventilation passage 341 sufficiently low. As a result, the elastic energy released from the back wall 242 in response to the removal of the shocking force FSH can return the gas PGS in a sufficient amount from the second clamber 332 to the first chamber 331.

In this way, both of the chambers 331 and 332 return to the state where the atmospheric pressures therein are equal, and the volumes thereof returns to the original value. Such cooperation with the outer box 240 enables reliable restoration of the cushioning ability of the fourth air cushioning material 234 even after the fourth air cushioning material 234 is once shocked.

[Measured Result of Cushioning Effect]

FIG. 5 is a graph illustrating the cushioning ability of the fourth air cushioning material 234 in the state illustrated in FIG. 4A. The vertical axis of the graph represents acceleration (hereinafter referred to as "shock acceleration") received by the lateral surface 104 of the MFP 100 along with the constant shocking force FSH in a ratio to the maximum value that the acceleration can have. The horizontal axis of the graph represents the proportion of gas having moved from the first chamber 331 to the second chamber 332 in response to the constant shocking force FSH, that is, the moving rate, in a change in the filling rate of gas in the first chamber 331. Each of points P0, P1, . . . , and P7 plotted on the graph is a measurement point having a pair of measurement values of the moving rate and the shock acceleration as coordinates. These measurement points P0 to P7 were obtained by experiments performed each time the proportion of the width of the ventilation passage 341 to the width (length in the Y-axis direction) of each of the bag bodies 311 to 315 was increased from 0% by 5%. A curve CV indicated by the graph is obtained by smoothly interpolating the measurement points P0 to P7. In the experiment, air was used as gas in the bag bodies 311 to 315, and the air filling rate in each of the bag bodies 311 to 315 was set to 75%. Both of the first and second chambers 331 and 332 have initial values of the air filling rates of 75%.

As illustrated by the points P0 to P3, even when the ventilation passage 341 have the narrow width of equal to or less than 15% and an amount of air moving from the first chamber 331 to the second chamber 332 is as small as 15% or less, the shock acceleration is mitigated to a little over 0.8. This indicates that relatively high cushioning ability can be obtained only by compression of air in the first chamber 331. As indicated by the points P4 to P6, as the width of the ventilation passage 341 is broadened from 20% to 30%, the amount of air moving from the first chamber 331 to the second chamber 332 is increased from 20% to 40%, and the shock acceleration is rapidly dropped to nearly 0.4. This indicates that the air movement from the first chamber 331 to the second chamber 332 considerably improves the cushioning ability. In the range from the point P6 to the point P7, the amount of air moving from the first chamber 331 to the second chamber 332 exceeds 40% due to the width of the ventilation passage 341 broadened from 30% to 35%, and the shock acceleration is increased again. This indicates that the amount of air remaining in the first chamber 331 is less than half (35%) of the original amount, and the cushioning ability by air compression is impaired.

The graph of FIG. 5 indicates the following. When the width of the ventilation passage 341 to the width (length in the Y-axis direction) of each of the bag bodies 311 to 315 is appropriately wide, and the rate of air moving from the first chamber 331 to the second chamber 332 can be secured at an appropriately high value, the cushioning ability due to the cooperation of the fourth air cushioning material 234 and the outer box 240 can be sufficiently improved. Specifically, when the width of the ventilation passage 341 to the width of each of the bag bodies 311 to 315 is 15% to 30%, and the rate of air moving between the chambers is 15% to 40%, the cushioning ability due to the cooperation of the third air cushioning material 233 and the outer box 240 is equal to or more than the cushioning ability of the block type cushioning material made of foamed plastic. The rate of air moving between the chambers can be within the range of 15% to 40% by setting an initial value of the air filling rate in each of the bag bodies 311 to 315, that is, the air filling rate in each of the chambers 331 and 332 to 55% or more.

[Relation Between Shape of Ventilation Passage and Cushioning Effect]

As described above, the bending section 342 included in the ventilation passage 341 enhances resistance that the flow of the gas PGS receives during passage through the ventilation passage 341. This results in high cushioning effect of the air cushioning materials 231 to 235 against external force. Actually, the fact that a design condition of the bending section 342 is a control factor for the cushioning ability of the air cushioning materials 231 to 234 was experimentally confirmed according to quality engineering as described later.

FIG. 6A is a schematic diagram illustrating design parameters of each of the bag bodies 311 to 315 (excluding the beam 316). FIG. 6B is a factor effect diagram illustrating the sensitivity of the bag body to the shock acceleration in relation to these parameters. This factor effect diagram was obtained by the following experiment. First, a jig imitating the MFP 100 to be packaged is packaged with packaging materials such as the air cushioning materials 231 to 234 and the outer box 240. The packaged jig is then mounted on a tilt shock tester and forced to collide against a fixed wall at a speed of 1.75 m/s. Shock is applied to the internal jig through the outer box 240. At the time, an acceleration sensor preliminarily mounted in the jig measures the shock acceleration received by the jig. The experiment was repeated with changing the values of the design parameters of bag bodies 311 to 315.

The design parameters of the bag body include the following six kinds of parameters illustrated in FIG. 6A in addition to the number of bag bodies (cells) which one air cushioning material has and the air filling rate of the bag body. The six kinds of parameters include a length (size in the X-axis direction) LCL and a width (size in the Y-axis direction) WCL of the bag body, a width WCH of the ventilation passage 341, a width (distance between the blocks 321 and 322) GBL of the bending section 342, widths (size in the X-axis direction) WBL of the blocks 321 and 322, and a minimum curvature radius (curvature radius of angles of the blocks 321 and 322) RCN of the bending section 342. Among these eight kinds of parameters, the width WCL of the bag body was fixed at 40 mm, and the other parameters were switched between two different values (first and second levels). The number of bag bodies was "four" at the first level and "five" at the second level. The air filling rate was 70% at the first level and 85% at the second level. The length LCL of the bag body was 300 mm at the first level and 400 mm at the second level. All of the widths WBL of the blocks 321 and 322, the width WCH of the ventilation passage 341, and the width GBL of the bending section 342 were 10 mm at the first level and 20 mm at the second level. The minimum curvature radius RCN of the bending section 342 was 3 mm at the first level and 5 mm at the second level.

As illustrated in the factor effect diagram of FIG. 6B, the difference in sensitivity between the first and second levels was calculated for each design parameter based on a plurality of measurement values of the shock acceleration. The "sensitivity" in the above-described experiment corresponds to the proportion of the shock acceleration received by the jig to the shocking force (acceleration) received by the outer box 240 upon collision against the fixed wall. In particular, the lower sensitivity means lower shock acceleration with respect to the shocking force from the outside, and thus means higher cushioning effect of the air cushioning materials 231 to 234. In FIG. 6B, points indicate sensitivities at each of the first and second levels for each design parameter. Points that exhibit higher cushioning effect of the air cushioning materials 231 to 234 are surrounded by rectangles. All of the widths WBL of the blocks 321 and 322, the number of the bag bodies, the length LCL of the bag body, and the air filling rate exhibit higher cushioning effects at the second level: 20 mm, "five", 400 mm, and 85%, respectively. In all of these design parameters, larger values result in a larger amount of air movable in response to shock from the outside, and larger energy that can be absorbed along with the movement. The cushioning effect is thus obviously higher at the second level. In contrast, all of the width WCH of the ventilation passage 341, the minimum curvature radius RCN of the bending section 342, and the width GBL of the bending section 342 exhibit higher cushioning effects at the first level: 10 mm 3 mm, and 10 mm, respectively. In all of these design parameters WCH, RCN and GBL, smaller values result in higher resistance received by air flow passing through the ventilation passage 341. In addition, the sensitivity difference between the first and second levels of any of the design parameters WCH, RCN, and GBL of the ventilation passage 341 is as large as those of the other design parameters (the number of the bag bodies, the length LCL of the bag body, and the air filling rate) except the widths WBL of the blocks 321 and 322. This means that the design conditions of the bending section 342 are as effective as the design conditions of the entire bag bodies 311 to 315 (the number, the length LCL, and the air filling rate) as control factors for the cushioning ability of the air cushioning materials 231 to 234.

FIG. 6C is a table illustrating one example of the relation between the design condition of the air cushioning materials 231 to 234 and the shock acceleration. In the table, the shock acceleration is represented in ratios to the gravitational acceleration (1G≈9.8 m/s$^2$). In upper and lower rows of the table, the design parameters (the number, the length LCL, the width WCL, and the air filling rate) of the bag bodies 311 to 315 have the same value, whereas the design parameters WCH, RCN, and GBL of the bending section 342 have different values. In the case, the shock acceleration is 14.5 G under the design condition of the upper row, and 22.0 G under the design condition of the lower row. In this way, the shock acceleration can be controlled over a sufficiently wide range even only with the design conditions of the bending section 342.

[Relation Between Width of Ventilation Passage and Restoring Effect of Cushioning Ability]

In the fourth air cushioning material 234 illustrated in FIG. 4B, when the shocking force FSH from the outside is removed, the restoring force RCF of the back wall 242, which returns from the deformed state to the original flat state, returns the gas PGS from the second chamber 332 to the first chamber 331 through the ventilation passage 341. In the case, when the width of the ventilation passage 341 is sufficiently large, gas in the same amount as that of the gas having moved from the first chamber 331 to the second chamber 332 along with the shocking force FSH returns to the first chamber 331, so that the fourth air cushioning material 234 can reliably restore the cushioning ability. The fact was actually verified as follows.

FIG. 6D is a table illustrating the relation between values of the width WCH of the ventilation passage 341 and the width GBL of the bending section 342, and success or failure of restoration of the cushioning ability, in the case where these values are equal. The table represents the result of the following experiment. First, among the design conditions of the upper row of the table illustrated in FIG. 6C, the filling rate is changed to 95%, and each of the width WCH of the ventilation passage 341 and the width GBL of the bending section 342 is equally changed to 4 mm, 6 mm, 8 mm, 10 mm, and 12 mm. The fourth air cushioning material 234 is then manufactured. Then, as illustrated in FIG. 3B, the bag bodies 311 to 315 are bent at the partitions 321 and 322, which serve as folds. The angle θ, which is formed by the longitudinal direction (X1-axis direction) of the first chamber 331 and the longitudinal direction (X2-axis direction) of the second chamber 332, is fixed at 90 degrees. In the state, the first chamber 331 is crushed to half a volume by external force, and a part of the inside air is moved to the second chamber 332. It was then verified whether the first chamber 331 returned to the original volume in a sufficiently short time from the time point when the external force had been removed. The verification was repeated three times for each of the width WCH=4 mm, 6 mm, 8 mm, 10 mm, and 12 mm of the ventilation passage 341. In FIG. 6D, circles indicate the case where the first chamber 331 returned to the original volume, and cross marks indicate the case where the first chamber 331 did not return to the original volume. As illustrated in FIG. 6D, when the width WCH of the ventilation passage 341 was 8 mm or more, the fourth air cushioning material 234 successfully restored the cushioning ability in all verifications. Each of the widths WCL of the bag bodies 311 to 315 was 40 mm. Consequently, when the width WCH of the ventilation passage 341 and the width GBL of the bending section 342 occupy a width of 20% or more to the width WCL of the bag body, the fourth air cushioning material 234 can reliably restore the cushioning ability.

[Advantages of Embodiment]

The packaging material according to the embodiment of the invention includes the air cushioning materials 231 to 235 as described above. Each of the cushioning materials 231 to 235 is bent at the partitions 321 and 322. The outer surface of the first chamber 331 of the bag bodies 311 to 315 receive pressure from one of surfaces of the MFP 100, and the outer surfaces of the second chambers 332 receive pressure from the other. When the first chamber 331 receives the shocking force FSH through the outer box 240 in this state, the gas PGS is moved from the first chamber 331 to the second chamber 332 through the ventilation passage 341 against the pressure applied to the second chamber 332 by the outer box 240. When the bag bodies 311 to 315 are flat, the ventilation direction of the bending section 342 included in the ventilation passage 341 crosses the straight line CLT connecting the center CP1 of the first chamber 331 and the center CP2 of the second chamber 332. The position, shape, or width of the bending section 342 is designed such that a straight line parallel to the straight line CLT connecting the centers CP1 and CP2 of both chambers cannot be drawn from the first chamber 331 to the second chamber 332 in the ventilation passage 341 without traversing the partitions 321 and 322. As a result, the ventilation passage 341 longer than the length projected on the plane (X1-X2 plane) including the longitudinal directions of both of the chambers 331 and 332 deprives the gas PGS of much heat by the friction with the inner surface of the ventilation passage 341. In addition, the larger three-dimensional change in the air flow direction in the bending section 342 deprives the gas PGS of large kinetic energy during passage. Furthermore, increase in atmospheric pressure in the second chamber 332 along with the movement of the gas PGS pushes back the back wall 242 of the outer box 240 to elastically deform the back wall 242. In this way, the energy applied to the first chamber 331 by the shocking force FSH is dissipated as heat while the gas PGS passes through the ventilation passage 341, and absorbed by the back wall 242 of the outer box 240 as elastic energy when the gas PGS flows into the second chamber 332. Such cushioning action resulted from cooperation of each of the air cushioning materials 231 to 235 and the outer box 240 cushions a part of energy applied to the first chamber 331 from the outside along with the shocking force FSH. The part of energy is to be transmitted to the surface of the MFP 100.

When the shocking force FSH is removed, the back wall 242 of the outer box 240 returns from the deformed state to the original flat state. Along with this, the gas PGS returns from the second chamber 332 to the first clamber 331. This air flow is slower than the airflow caused by the shocking force FSH from the first chamber 331 to the second chamber 332, and thus has lower resistance when passing through the bending section 342. In addition, the width WCH of the ventilation passage 341 and the width GBL are designed to be sufficiently larger than the width WCL of each of the bag bodies 311 to 315, and thus the energy lost as frictional heat while the air flow passes through the ventilation passage 341 is also sufficiently small. As a result, the elastic energy released from the back wall 242 in response to the removal of the shocking force FSH can return the gas PGS in a sufficient amount from the second chamber 332 to the first chamber 331. Such restoring action due to the cooperation of each of the air cushioning materials 231 to 235 and the outer box 240 enables reliable restoration of the cushioning ability of the air cushioning materials 231 to 234 even after the air cushioning materials 231 to 234 are once shocked.

In this way, the packaging material according to this embodiment of the invention can sufficiently increase resistance to be received by gas moving between the bag bodies in response to external force, and reliably restore the cushioning ability along with release from the external force, without increasing the number of parts of the cushioning material and complicating the structure.

The packaging material according to this embodiment of the invention also has the following advantages in addition to the above-described advantages. First, according to a block type cushioning material made of foamed plastic, each of the air cushioning materials 231 to 235 can have highly-set cushioning ability as long as having the same thickness, and reduced usage amount of resin as long as having the same cushioning ability. In this sense, the air cushioning materials 231 to 235 are environmentally friendly. Secondly, the air cushioning materials 231 to 235 can be reduced to approximately 1% in volume when air is removed from the bag bodies 311 to 316 upon disposal. The air cushioning materials 231 to 235 thus have an advantage in reducing the disposal amount of the packaging material. Thirdly, the air cushioning materials 231 to 235 are made of soft resin, and sheet-shaped as illustrated in FIG. 3A, so that the air cushioning materials 231 to 235 can be stored compactly by, for example, being cylindrically wound. The air cushioning materials 231 to 235 thus have an advantage in reducing storage space for the packaging material. Fourthly, the ventilation passage 341 does not need a part for increasing air resistance, such as a check valve. The number of parts of the air cushioning materials 231 to 235 is inhibited, and the structure can be kept simple. Fifthly, as illustrated in FIG. 6C, the cushioning ability of the air cushioning materials 231 to 235 can be controlled over a sufficiently wide range even only with the design conditions of the bending section 342. The air cushioning materials 231 to 235 thus have high design flexibility.

[Variations]

(A) The image forming apparatus 100 illustrated in FIG. 1A is an MFP. In addition, the image forming apparatus to be packaged may be a single-function machine such as a printer, a copier, and a facsimile machine, or an optional machine such as a paper feeding unit and a finisher. An object to be packaged may also be, for example, an electronic appliance such as a personal computer and a server, a large home appliance such as a washing machine and a refrigerator, a machine tool such as a lathe, a finished product of an industrial robot, or a part therefor.

(B) The bag bodies 311 to 316 of the air cushioning material 234 illustrated in FIG. 3A lave a strip shape in the planar shape. The first and second chambers 331 and 332 have an equal volume and outer circumferences in the planar shape which are symmetric with respect to the center line CLL in the longitudinal direction (X-axis direction) of the bag body. In addition, the bag body may have a polygonal shape such as a triangle or a shape including a curve in the circumference such as a semicircle in the planar shape. In the case, the first and second chambers are required to have an equal volume and outer circumferences in the planar shape which are symmetric about an intersection point of the center line CLL in the longitudinal direction (X-axis direction) of the bag body and the center line CLT in the width direction (Y-axis direction).

(C) In the bag bodies 311 to 316 illustrated in FIG. 3A, the partitions 321 and 322 form one ventilation passage 341 between the first and second chambers 331 and 332. Two or more ventilation passages may be additionally provided. All ventilation passages include the bending sections. The position, shape, or width of each section is required to be designed such that a straight line parallel to the straight line CLT connecting the centers CP1 and CP2 of both chambers cannot be drawn from the first chamber 331 to the second chamber 332 in the ventilation passage 341 without traversing the partitions 321 and 322. In the case, the cushioning ability due to cooperation of the air cushioning material and the outer box 240 is sufficiently high. Furthermore, the width WCH of the ventilation passage 341 and the GBL are required to be designed to be sufficiently larger than the width WCL of each of the bag bodies 311 to 315 so that the gas PGS in a sufficient amount can be returned from the second chamber 332 to the first chamber 331 in response to removal of the shocking force FSH. In the case, the restoring effect of the cushioning ability due to the cooperation of the air cushioning material and the outer box 240 is sufficiently high.

The ventilation passage is preferably symmetric about the intersection point of the center line CLL in the longitudinal direction (X-axis direction) of the bag body and the center line CLT in the width direction (Y-axis direction) similarly to the ventilation passage 341 illustrated in FIG. 3A. This configuration allows the air cushioning material to have sufficiently high cushioning effect and restoring effect of the cushioning ability even when either of the first and second chambers receives external force through the outer box 240.

(D) In the bag bodies 311 to 316 illustrated in FIG. 3A, both of the blocks 321 and 322 have a rectangular shape elongated in the width direction (Y-axis direction) of the bag body in the planar shape. The blocks 321 and 322 have an equal width in the longitudinal direction (X-axis direction) of the bag body, and have entire circumferences sealed by the thermal welding portion 301. This configuration causes the ventilation passage 341 to have a bending angle of 90 degrees. The block may have a more complicated planar shape. A side of the block may be tilted with respect to the longitudinal direction of the bag body, or may be curved.

Figure 7:
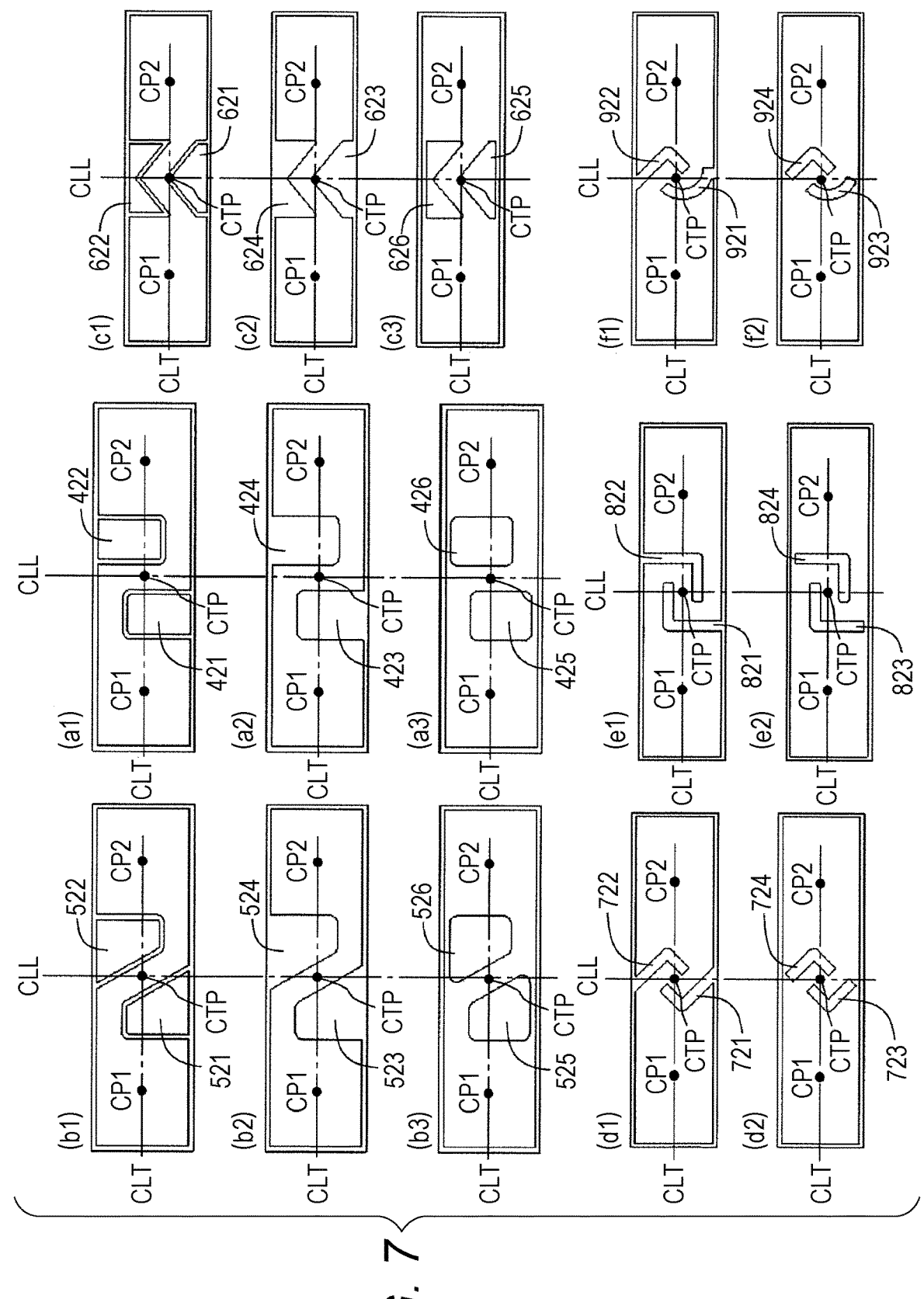
FIG. 7 includes plan views (a1) to (f2) illustrating variations of parts, which are included in the same bag body, of the first and second type blocks.

(a1) to (f2) in FIG. 7 are plan views illustrating variations of parts, which are included in the same bag body, of the first and second type blocks. Although not illustrated in FIG. 7, when two bag bodies are adjacent in the width direction, the blocks are preferably designed to have a shape of mirror image relation to each other between these bag bodies similarly to FIG. 3A.

In the first variation illustrated in (a1) to (a3) in FIG. 7, all blocks 421 to 426 have rectangular shapes similar to that of the blocks 321 and 322 illustrated in FIG. 3A. The first type blocks 421, 423, and 425 and the second type blocks 422, 424, and 426 are symmetric, in both position and shape, about the intersection point (hereinafter referred to as a "center point") CTP of the center line CLL in the longitudinal direction (X-axis direction) of the bag body and the center line CLT in the width direction (Y-axis direction). The way of thermal welding for the block differs between three bag bodies illustrated in (a1) to (a3) in FIG. 7. In the blocks 421 and 422 illustrated in (a1) in FIG. 7, the thermal welding portion 301 extends along each circumference similarly in the blocks 321 and 322 illustrated in FIG. 3A. In the blocks 423 and 424 illustrated in (a2) in FIG. 7, each of the entire regions is thermally welded. In the blocks 425 and 426 illustrated in (a3) in FIG. 7, short distances are placed from the long sides of the bag body, and remaining entire regions are thermally welded.

In the second variation illustrated in (b1) to (b3) in FIG. 7, all blocks 521 to 526 have a trapezoidal shape. The first type blocks 521, 523, and 525 and the second type blocks 522, 524, and 526 are symmetric, in both position and shape, about the center point CTP of the bag body. The way of thermal welding for the block differs between three bag bodies illustrated in (b1) to (b3) in FIG. 7. In the blocks 521 and 522 illustrated in (b1) in FIG. 7, the thermal welding portion 301 extends along each circumference. In the blocks 523 and 524 illustrated in (b2) FIG. 7, each of the entire regions is thermally welded. In the blocks 525 and 526 illustrated in (b3) in FIG. 7, short distances are placed from the long sides of the bag body, and remaining entire regions are thermally welded.

In the third variation illustrated in (c1) to (c3) in FIG. 7, unlike FIG. 3A, both of the first type blocks 621, 623, and 625 and the second type blocks 622, 624, and 626 are positioned on the same straight line extending in the width direction of the bag body. The first type blocks 621, 623, and 625 project to the straight line CLT, which connects the center point CP1 of the first chamber and the center point CP2 of the second chamber, and the second type blocks 622, 624, and 626 are recessed from the straight line CLT. All of the blocks 621 to 626 are symmetric with respect to the center line CLL in the longitudinal direction (X-axis direction) of the bag body. The way of thermal welding for the block differs between three bag bodies illustrated in (c1) to (c3) in FIG. 7. In the blocks 621 and 622 illustrated in (c1) in FIG. 7, the thermal welding portion 301 extends along each circumference. In the blocks 623 and 624 illustrated in (c2) in FIG. 7, each of the entire regions is thermally welded. In the blocks 625 and 626 illustrated in (c3) in FIG. 7, short distances are placed from the long sides of the bag body, and remaining entire regions are thermally welded.

In the fourth variation illustrated in (d1) and (d2) in FIG. 7, all of the blocks 721 to 724 have a hook shape. The first type blocks 721 and 723 and the second type blocks 722 and 724 are symmetric, in both position and shape, about the center point CTP of the bag body. In particular, each side of the hook shape is tilted with respect to both of the center lines CLL and CLT. The way of thermal welding for the block differs between two bag bodies illustrated in (d1) and (d2) in FIG. 7. In the blocks 721 and 722 illustrated in (d1) in FIG. 7, each of the entire regions is thermally welded. In the blocks 723 and 724 illustrated in (d2) in FIG. 7, short distances are placed from the long sides of the bag body, and remaining entire regions are thermally welded.

In the fifth variation illustrated in (e1) and (e2) in FIG. 7, all of blocks 821 to 824 have a hook shape, and the first type blocks 821 and 823 and the second type blocks 822 and 824 are symmetric, in both position and shape, around the center point CTP of the bag body, similarly in the fourth variation illustrated in (d1) and (d2) in FIG. 7. Meanwhile, unlike in the fourth variation illustrated in (d1) and (d2) in FIG. 7, each side of the hook shape is parallel to either of the center lines CLL and CLT. The way of thermal welding for the block differs between two bag bodies illustrated in (e1) and (e2) in FIG. 7. In the blocks 821 and 822 illustrated in (e1) in FIG. 7, each of the entire regions is thermally welded. In the blocks 823 and 824 illustrated in (e2) in FIG. 7, short distances are placed from the long sides of the bag body, and remaining entire regions are thermally welded.

In the sixth variation illustrated in (f1) and (f2) in FIG. 7, first type blocks 921 and 923 have an arc shape, whereas second type blocks 922 and 924 have a hook shape. The first type blocks 921 and 923 and the second type blocks 922 and 924 are symmetric, only in position, about the center point CTP of the bag body. The way of thermal welding for the block differs between two bag bodies illustrated in (f1) and (f2) in FIG. 7. In the blocks 921 and 922 illustrated in (f1) in FIG. 7, each of the entire regions is thermally welded. In the blocks 923 and 924 illustrated in (f2) in FIG. 7, short distances are placed from the long sides of the bag body, and remaining entire regions are thermally welded.

In any of the first to sixth variations, the gap between the first type block and the second type block communicate two chambers, and functions as the ventilation passage 341. In addition, each of the ventilation passages 341 includes the bending section 342. When the bag body is flat, the ventilation direction of the bending section 342 crosses the straight line CLT connecting the centers CP1 and CP2 of both chambers. The bending section 342 makes it impossible to draw a straight line parallel to the straight line CLT in the ventilation passage 341 from one chamber to the other without traversing the blocks 421 to 924. Furthermore, when the width of the ventilation passage 341 is sufficiently wide, the flow rate of gas returning from one chamber to the other can be secured at a predetermined value or more upon removal of external force. Consequently, in any of the first to sixth variations, the air cushioning material can achieve both of the high cushioning effect and the reliable restoring effect of the cushioning ability.

The invention relates to a packaging material. An air cushioning material is used in combination with an outer box as described above. In the way, the invention is clearly industrially applicable.

Although embodiments of the present invention have been described and illustrated in detail, the disclosed embodiments are made for purposes of illustration and example only and not limitation. The scope of the present invention should be interpreted by terms of the appended claims.

What is claimed is:

1. A packaging material comprising:
    an outer box having a plurality of inner walls defining a space that accommodates an article to be packaged; and
    a cushioning material configured to fit within the space, the cushioning material including:
    a sealed bag body with gas confined inside;
    two or more partitions that divide an inside of the bag body into a first chamber and a second chamber; and
    a ventilation passage communicating the first and second chambers,
    when the cushioning material is disposed in the space, the cushioning material is bent at the partition,
    when the first chamber of the bag body receives an external force from the outer box, gas is moved from the first chamber to the second chamber through the ventilation passage against pressure applied to the second chamber by the outer box, and when the external force is removed, the gas is returned from the second chamber to the first chamber through the ventilation passage owing to the pressure applied to the second chamber by the outer box, and
    the ventilation passage includes a bending section whose ventilation direction crosses a straight line connecting centers of the first and second chambers when the bag body is flat, and a position, a shape, or a width of the bending section is designed such that any straight line parallel to the straight line connecting the centers from the first chamber to the second chamber in the ventilation passage traverses at least one of the two or more partitions, and a flow rate of gas to be returned from the second chamber to the first chamber upon removal of the external force is based on a size of the ventilation passage.

2. The packaging material according to claim 1,
    wherein the bag body includes a sheet including soft resin, and
    the two or more partitions are regions obtained by welding or bonding two inner surface portions of the bag body to each other, the portions being opposed to each other across internal space of the bag body.

3. The packaging material according to claim 1,
    wherein the outer box has higher rigidity than the cushioning material, and pressure applied to the outer surfaces of the first and second chambers of the bag body by the outer box is based on stress of the outer box preventing deformation of the outer box due to atmospheric pressures in the first and second chambers.

4. The packaging material according to claim 1,
    wherein gas in the bag body has a filling rate of 55% or more.

5. The packaging material according to claim 1,
    wherein, when the bag body is flat, the first and second chambers have an outer circumferential shape symmetric with respect to a straight line extending in a longitudinal direction of the one or more partitions or a center point in the longitudinal direction of the one or more partitions.

6. The packaging material according to claim 1,
    wherein, in a state of being flat, the bag body has a strip shape elongated in a direction perpendicular to the longitudinal direction of the partition, and at least one other bag body having the same structure as the bag body is coupled in parallel to either or both sides of the bag body in the longitudinal direction.

* * * * *